PERISTALTIC ACTUATOR

Filed Dec. 6, 1965 2 Sheets-Sheet 1

INVENTOR.
Hugh J. Robertson
BY
Irving M. Kriegsman
ATTORNEY.

June 18, 1968 H. J. ROBERTSON 3,389,274

PERISTALTIC ACTUATOR

Filed Dec. 6, 1965 2 Sheets-Sheet 2

INVENTOR.

Hugh J. Robertson

BY

Irving M. Kriegsman

ATTORNEY.

United States Patent Office 3,389,274

Patented June 18, 1968

3,389,274
PERISTALTIC ACTUATOR

Hugh J. Robertson, Wilton, Conn., assignor to The Perkin-Elmer Corporation, Norwalk, Conn., a corporation of New York Filed Dec. 6, 1965, Ser. No. 511,704
19 Claims. (Cl. 310—8)

Figure 1:
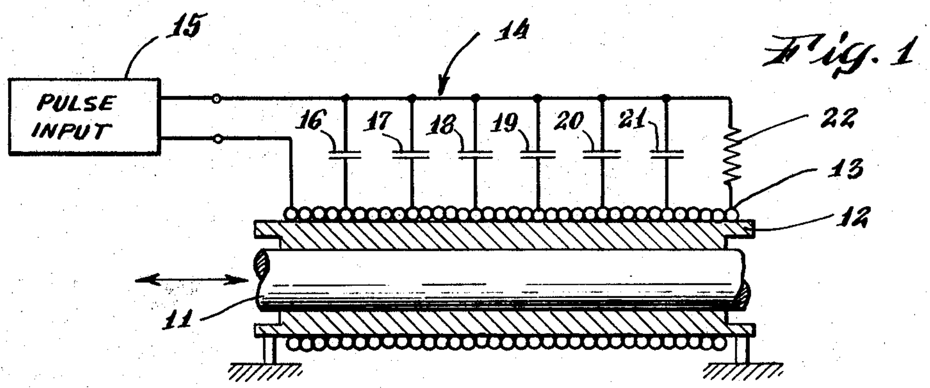

The present invention is related to actuators, and more specifically to an electrically operated peristaltic actuator capable of obtaining displacements in very small increments.

The classical way of obtaining large displacements with fine control has been with the precision screw. Precision screws, however, are known to be troubled by backlash and striction problems and require accurate angular positioning to achieve very fine increments of displacement. Accordingly, the need has arisen for devices capable of providing displacements on the order of a millionth of an inch or less and yet achieve total displacements of a tenth of an inch or more. Such devices would have particular use in the optical instrument field where for example it is often desired to move an optical element a small increment.

It has been proposed to provide for an actuating device in which a rod of magnetostrictive material is caused to expand (or contract) when subjected to a magnetic field. An axial displacement of the rod relative to a fixed member is obtained by selectively clamping and unclamping the ends of the rod. Although a device of this type would appear to be satisfactory, the clamping action required limits the ultimate minimum displacement since it always introduces some axial component or force as it grips and releases.

It is, therefore, an object of the present invention to provide for a new and improved actuator capable of very small displacements.

It is another object of the present invention to provide for an improved actuator operable under the principle of magetostriction.

It is still another object of the present invention to provide for an improved actuator operable under the principle of electrostriction.

It is yet still another object of the present invention to provide for an improved linear actuator in which a displacement of one member relative to another is caused by an expansion of one of said members and which requires no clamping type holding means.

It is still another object of the present invention to provide for an actuator device utilizing an expansible material which is activated by a pulsating electrical signal.

It is yet still another object of the present invention to provide for an actuating device wherein one member is slidably mounted for frictional movement relative to another member and which is moved when subjected to an electromagnetic field .

The above and other objects are achieved by means of the present invention in which a member of either magnetostrictive or piezoelectric material is excited. The material is excited with a pulsating type signal which is applied in a particular sequence. For the magnetostrictive material the exciting means is a magnetic field and fo the piezoelectric material the exciting means is an electric field. The field is applied along the length of the material. In one version of the present invention a pulse travels through a coil. In another version of the device a plurality of coils disposed along the length of the member are pulse energized in overlapping sequence. In each case, portions, of the material either expand or contract in directional sequence and cause a peristaltic type movement of the member relative to another member that it is in frictional contact with.

Figure 2:
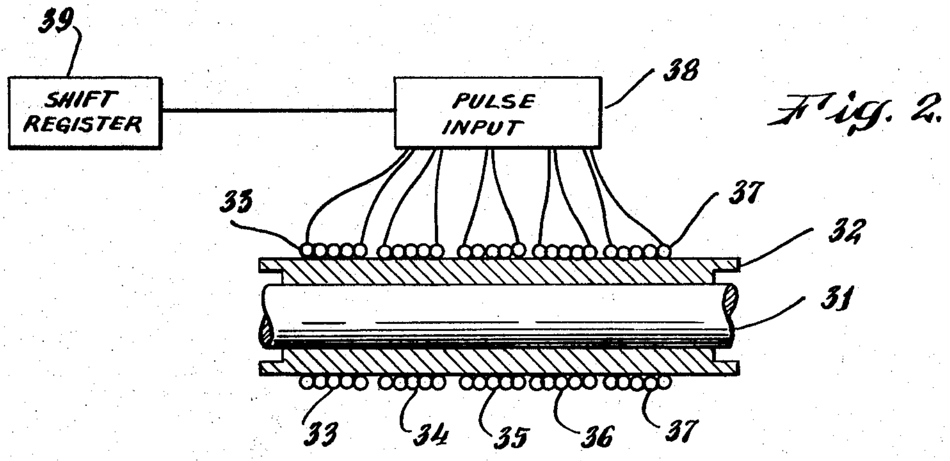
Figure 3:
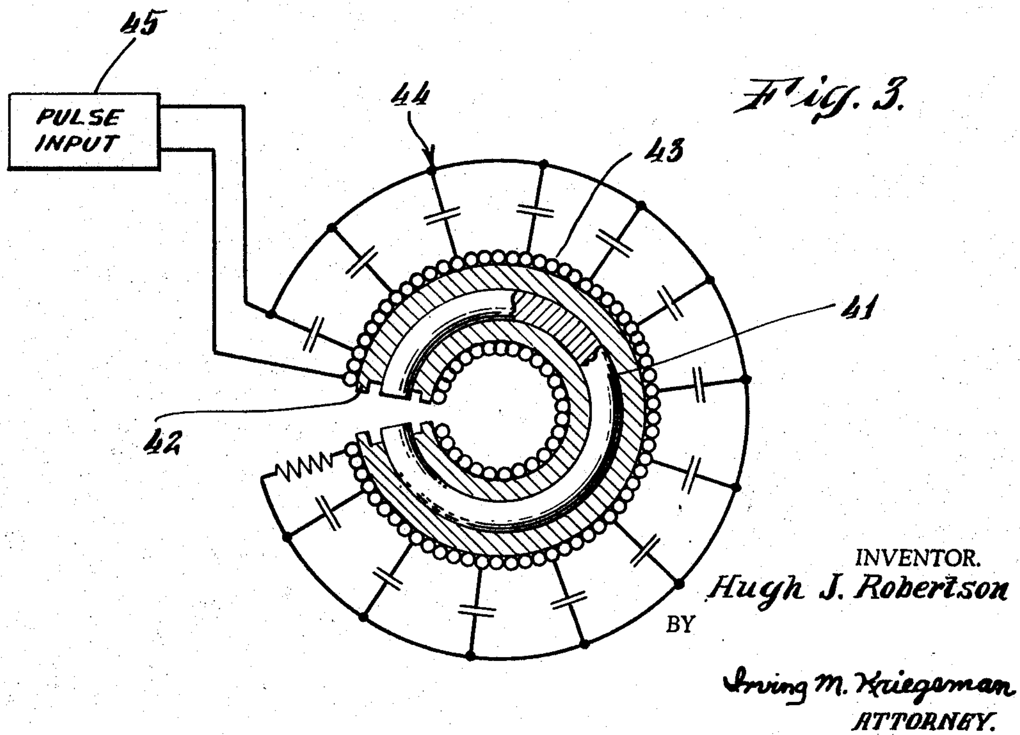
Figure 4:
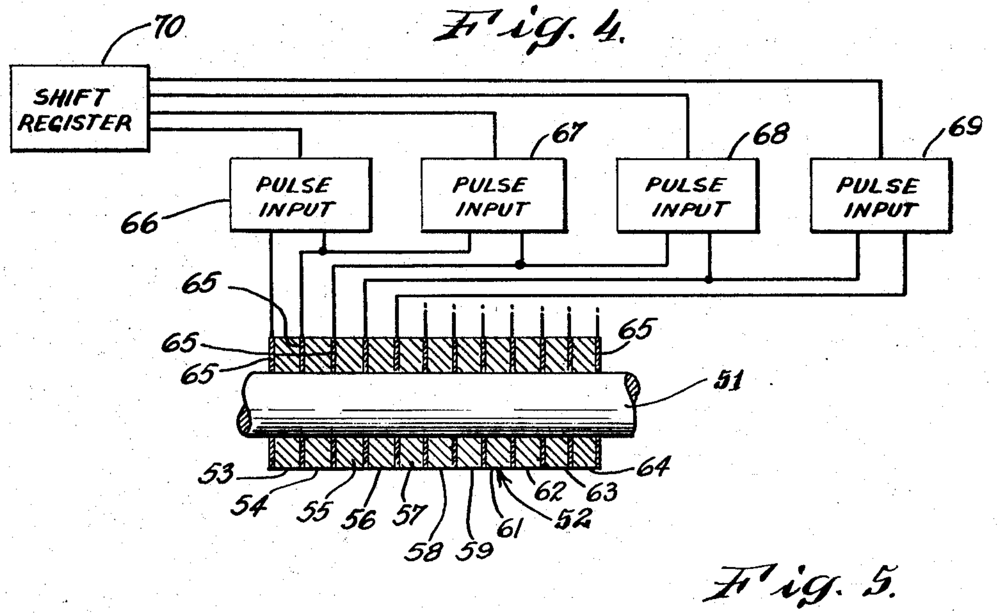
Figure 5:
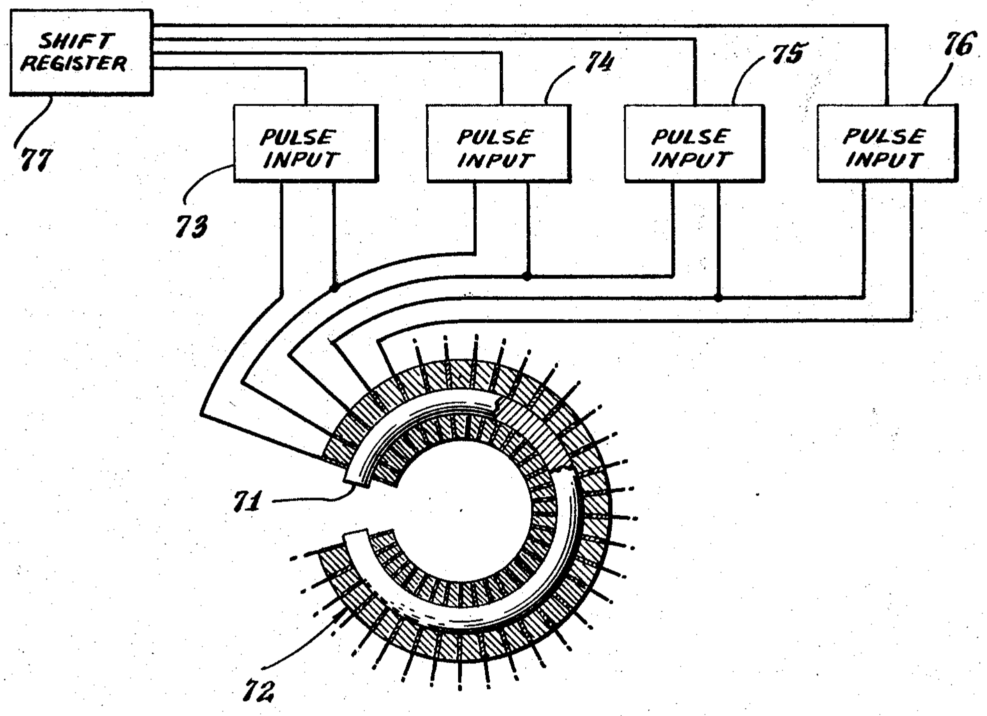

The above and other objects and advantages of the present invention will become apparent and more easily understood upon reference to the following detailed description when taken in conjunction with the drawings wherein:

FIGURE 1 is a schematic representation partly in section of an embodiment of the present invention having magnetostrictive material and a single electrical coil, FIGURE 2 is a schematic representation partly in section of another embodiment of the present invention having magnetostrictive material and a plurality of discrete coils, FIGURE 3 is a schematic representation partly in section of another embodiment of the present invention having magnetostrictive material and a single electrical coil, FIGURE 4 is a schematic representation partly in section of another embodiment of the present invention having piezoelectric material and a pulse input means, and FIGURE 5 is a schematic representation partly in section of another embodiment of the present invention having piezoelectric material and a pulse input means.

Referring now to FIGURE 1 there is shown one embodiment of the present invention which includes an elongated rod 11 of magnetostrictive material. The rod 11 may be fabricated from any material having magnetostrictive properties such as for example nickel or cold rolled steel. The elongated rod member 11 is telescopically mounted in tight fitting relationship for frictional movement within an elongated tubular sleeve member 12 of non-magnetic material. Although the rod 11 and sleeve 12 are shown to be circular in a cross section, other cross-sectional shapes such as rectangular or triangular are considered within the scope of this invention. Wound around and extending substantially along the entire length of the sleeve member 12 is a coil 13 of electrically conductive material. The coil 13 is connected through a delay line 14 to a pulse input means 15 in the form of, for example, a pulse generator. However, other sources of pulsating current could also be employed. The delay line 14 is of the type well known to one of ordinary skill in the art and includes a plurality of capacitors 16, 17, 18, 19, 20, 21 and a terminating impedance 22. The pulse input means 15 is such that it provides an electrical pulse having a width substantially smaller to the length of the coil 13. By means of the built in delay line 14, the length of the pulse is small in comparison to the time it takes for the pulse to travel the length of the coil 13. For example, the current pulse may be in the range of 50$\mu$ seconds and the built in delay line 14 and coil may be sized to 500$\mu$ seconds.

The actuator operates in the following manner. As a pulse is introduced at one end of the coil 13, a magnetic field is created which causes a localized expansion or contraction of the rod 11. This localized expansion or contraction in effect "moves" down the length of the rod 11 with the same velocity as the current pulse travels down the coil 13. The choice of magnetostrictive material determines whether the change in length is an expansion or contraction. The cumulative result once the pulse travels the length of the coil 13 is an axial displacement of the rod 11 relative to the sleeve 12. Accordingly, if the sleeve member 12 is fixed as shown, the rod member 11 will move. It is to be noted, however, that the rod member 11 could be fixed which in turn would cause the sleeve 12 to move. If the rod member 11 is of a material having a positive coefficient of magnetostriction, the rod 11 will be moved or displaced in a direction opposite to the direction that the pulse is traveling.

Referring now to FIGURE 2, there is shown another version of the present invention which includes a rod member 31 and a sleeve member 32 similar to the rod 11 and sleeve 12 shown in FIGURE 1. However, in this embodiment in place of the coil 13 and delay line 14 of the FIGURE 1 embodiment, there is provided a plurality of discrete coils 33, 34, 35, 36, 37 positioned along the length of the sleeve 32 and surrounding said sleeve 32. Each of the coils 33–37 is electrically connected to a pulse input 38 which in turn is electrically connected to a shift register 39 or other type of timing switch well known in the art. The shift register 39 is arranged so that a pulse from the pulse input source 38 is transmitted to each of the coils 33–37 in directional sequence; that is coil 33 is first energized, then coil 34, then coil 35, etc. The shift register 39 is further arranged so that it triggers the pulse input 38 to the coils 33–37 in overlapping sequence.

The operation of this embodiment is substantially similar to the embodiment shown in FIGURE 1. Accordingly, a localized magnetic field will be created sequentially along portions of the rod 31 as coils 33–37 are energized in overlapping sequence which in turn will cause a localized expansion (or contraction) of the rod 31.

Referring now to FIGURE 3, there is shown still another embodiment of the present invention which includes a rod member 41 telescopically mounted for slidable movement within a sleeve member 42. Surrounding the sleeve member 42 is an electrically conductive coil 43 which is electrically connected to a delay line 44 which in turn is connected to a pulse input means 45. Each of the elements in this embodiment is substantially similar to the device shown in FIGURE 1. However, in this embodiment the rod member 41 and sleeve 42 are substantially circular in shape rather than linear in shape as in FIGURE 1.

Referring now to FIGURE 4, there is shown still another embodiment of the present invention which includes a rod member 51 telescopically mounted in tight fitting relationship for slidable movement within a sleeve member 52. The sleeve member 52 is comprised of a plurality of ring-like discs 53 through 64 stacked in end to end relationship and rigidly interconnected. Each plate is fabricated from piezoelectric material. The end surfaces of each plate are provided with an electrically conductive coating 65. The apparatus further includes a plurality of pulse input generating devices 66 through 69 etc. equal in number to the number of piezoelectric plates. One pulse input generating device is connected to the ends of each piezoelectric plate. Thus, pulse input generating device 66 is connected to the two coated end surfaces of piezoelectric plate 53 and pulse input generating device 67 is connected to the two coated end surfaces of piezoelectric plate 54 etc. Each one of the pulse input generating devices 66 through 69, etc. is also electrically connected to a shift register 70 or other suitable switch means.

The device operates in the following manner. When a pulse input is applied to piezoelectric plate 53, it will expand endwise. Similarly, the other piezoelectric plates 54 through 64 will expand as they are excited. By applying a pulse to each of the piezoelectric plates 53 through 64 in directional and overlapping sequence, the cumulative result is an axial displacement of the rod member 51 relative to the stack of plates 53 through 64.

Referring now to FIGURE 5, there is shown still another embodiment of the present invention which includes a rod member 71, a sleeve of piezoelectric plates 72, plurality of pulse inputs 73, 74, 75, 76 and shift register 77 similar to the FIGURE 4 embodiment. However, in this embodiment the rod member 71 and sleeve member 72 are circular in shape rather than linear in shape as shown in FIGURE 4.

It is to be understood that many modifications and changes may be made without departing from the spirit and scope of this invention. For example, the telescoping rod and sleeve combination in the FIGURE 3 embodiment could be replaced by a single ring of magnetostrictive material frictionally mounted on a ring of non-conductive material. Energizing the coil would then cause a rotational movement or displacement of the magnetostrictive ring member relative to and within the non-conductive ring member. The FIGURE 5 embodiment could also be similarly modified.

Accordingly, the invention as described herein above is only by way of example and not as a limitation as to the claims.

What is claimed is:

1. A peristaltic actuator comprising: a first member, a second member, of material changeable in size when excited, in frictional communication with and mounted for slidable movement in the direction of its longitudinal axis relative to said first member, and means for exciting portions of said second member in sequence along the direction of its longitudinal axis, causing thereby a displacement of one of said members relative to the other member.

2. The peristaltic actuator according to claim 1 and wherein said first member comprises an elongated sleeve, and said second member comprises a rod of ferromagnetic material telescopically mounted within said sleeve.

3. The peristaltic actuator according to claim 2 and wherein said means for exciting portions of said second member comprises a coil surrounding said sleeve member, a delay line connected to the coil, and a pulse generator connected to the delay line.

4. The peristaltic actuator according to claim 2 and wherein said means for exciting portions of said second member comprises a plurality of discrete coils surrounding said sleeve member, a pulse generator connected to said plurality of coils, and a timing switch connected to said pulse generator for controlling the passage of a pulse signal from the pulse generator to the plurality of coils.

5. The peristaltic actuator according to claim 3 and wherein said rod and said sleeve member are substantially circular in shape.

6. The peristaltic actuator according to claim 1 and wherein said first member comprises a rod and wherein said second member comprises a sleeve formed by a plurality of piezoelectric discs arranged in a stacked relationship.

7. The peristaltic actuator according to claim 6 and wherein the end surfaces of the piezoelectric discs are coated with conductive material.

8. The peristaltic actuator according to claim 7 and wherein the means for exciting portions of said sleeve member comprises a pulse generator electrically connected to the end surfaces of each piezoelectric disc, and a timing circuit connected to each pulse generator for exciting each piezoelectric disc in overlapping sequence.

9. The peristaltic actuator according to claim 8 and wherein the rod member and sleeve member are substantially circular in shape.

10. A peristaltic actuator comprising a tubular sleeve member of non-conductive material, an elongated rod of magnetostrictive material telescopically mounted within said sleeve member for slidable movement and in frictional communication with said sleeve member, a plurality of discrete coils surrounding said tubular sleeve member and positioned along the length of said sleeve member and, pulse input means connected to said plurality of coils for energizing said coils in overlapping sequence.

11. A peristaltic actuator comprising an elongated rod, a tubular sleeve member in frictional communication with said elongated rod and telescopically mounted for slidable movement on said rod, said sleeve member comprising a stack of piezoelectric discs, each of said discs having a pair of end surfaces, each of said end surfaces having a coating of electrically conductive material and, means for applying a pulsating signal to said plurality of plates in overlapping and directional sequence.

12. The peristaltic actuator according to claim 1 and wherein the material changeable in size is ferromagnetic and thereby adapted to be excited by means of a magnetic field.

13. The peristaltic actuator according to claim 1 and wherein the material changeable in size is piezoelectric and thereby adapted to be excited by means of an electric field.

14. A peristaltic actuator comprising: an elongated inner member, an elongated tubular outer member in frictional communication with the elongated inner member and telescopically mounted on the inner member for slidable movement, one of the members comprising a stack of piezoelectric elements adapted to change in size when excited and means for exciting each of the piezoelectric elements in overlapping and directional sequence.

15. The peristaltic actuator according to claim 14 and wherein the piezoelectric elements are in the form of discs.

16. The peristaltic actuator according to claim 15 and wherein the discs are coated on their end surfaces with electrically conductive material.

17. The peristaltic actuator according to claim 14 and wherein the inner and outer members are substantially circular in shape.

18. The peristaltic acuator according to claim 17 and wherein the member comprising a stack of piezoelectric elements is the inner member.

19. The peristaltic actuator according to claim 14 and wherein the means for exciting the stack of piezoelectric elements comprises a separate pulse input generating device connected to each of the piezoelectric elements and switching means for energizing each of the pulse input generating devices in overlapping and directional sequence.

References Cited

UNITED STATES PATENTS

| | | | |
|---|---|---|---|
| 2,401,094 | 5/1946 | Nicholson | 310—26 |
| 2,506,141 | 5/1950 | Drovin | 310—26 |
| 3,138,749 | 6/1964 | Stibitz | 310—26 |
| 3,233,749 | 2/1966 | DeVol | 310—26 |
| 3,292,019 | 12/1966 | Hsu | 310—8.5 |

J. D. MILLER, *Primary Examiner.*